May 20, 1947.  M. C. MOORE ET AL  2,420,674
VERTICAL GYRO ERECTION CONTROLLER
Filed Dec. 8, 1944   2 Sheets-Sheet 2
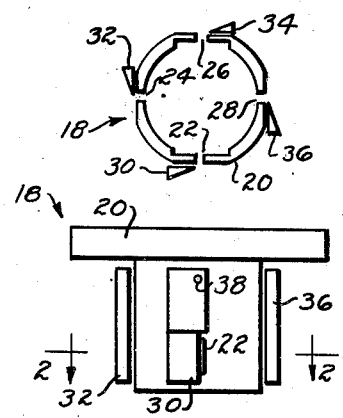
Fig. 2.
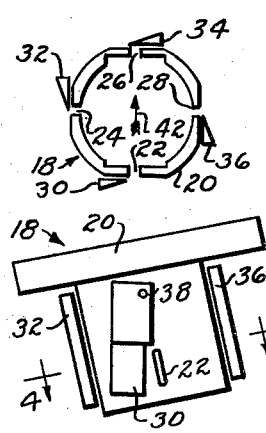
Fig. 4.
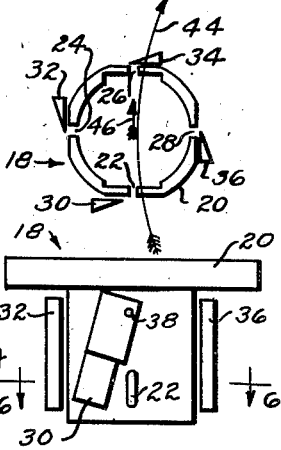
Fig. 6.
Fig. 1. Fig. 3. Fig. 5.
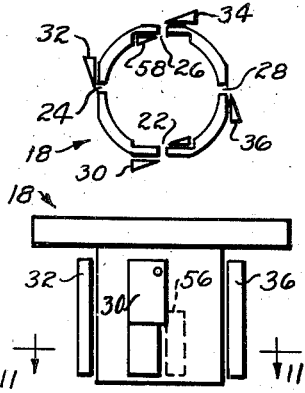
Fig. 11.
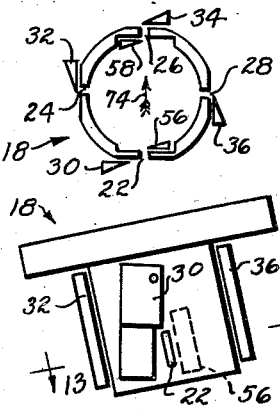
Fig. 13.
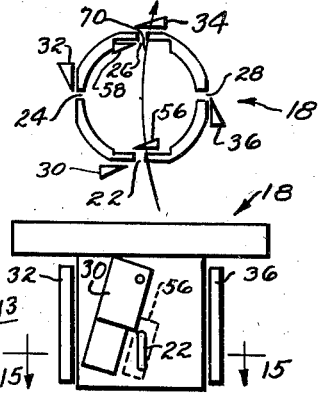
Fig. 15.
Fig. 10. Fig. 12. Fig. 14.
INVENTORS
MARLIN C. MOORE
HENRY BRIDGMAN
BY
ATTORNEYS Patented May 20, 1947

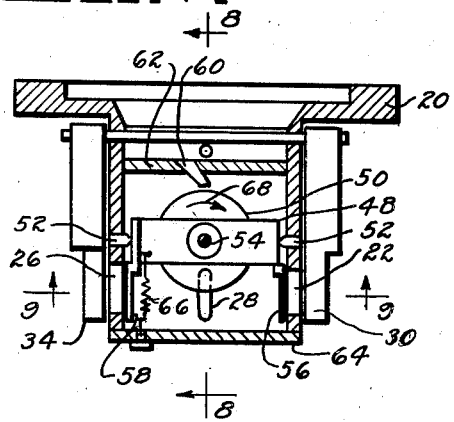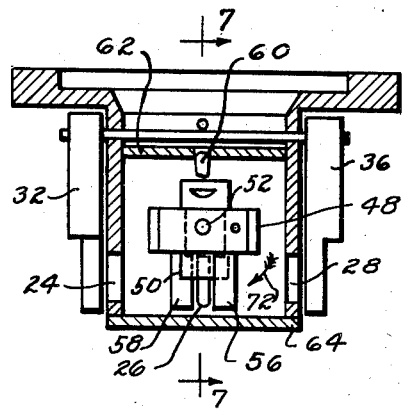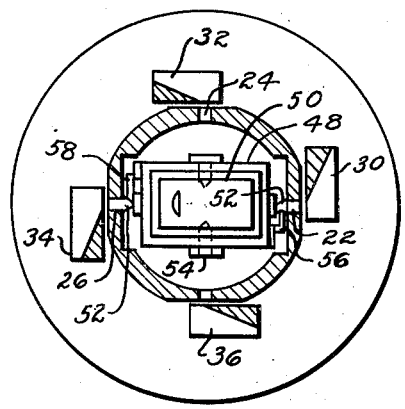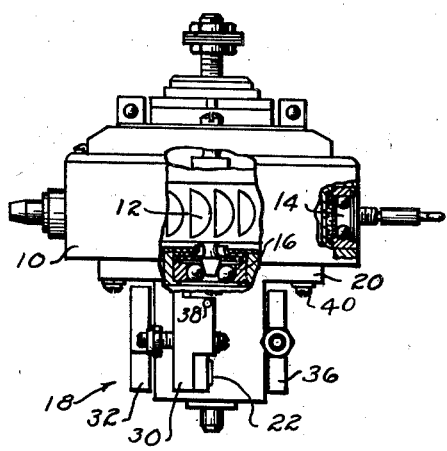

2,420,674

UNITED STATES PATENT OFFICE 2,420,674

VERTICAL GYRO ERECTION CONTROLLER

Marlin C. Moore, Xenia, and Henry Bridgman, Springfield, Ohio

Application December 8, 1944, Serial No. 567,292

10 Claims. (Cl. 74—5)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to airdriven gyro instruments, wherein the spin axis is maintained in a proper relation with respect to the true vertical, and particularly to improvements in the erecting mechanism employed in these instruments for applying correcting torques when the rotor axis deviates from its true vertical position. It is especially applicable to horizon indicators for aircraft, although it is not limited to this use.

Gyroscopes of this character are generally arranged for three degrees of freedom, the spin axle being pivotally supported by an inner gimbal which is usually the rotor housing, this gimbal being pivotally supported by an outer gimbal, which is, in turn, pivotally supported by a fixed frame or housing. When bearing friction, or change in the gravity due to the earth's surface curvature, causes the spin axle to deviate from its proper relation to the true vertical, a correcting means, for applying small torques which cause the gyro rotor to precess back to its true position, is required.

It is a well-known practice, in designing gyroscopes of this class, to employ, as correcting devices for the above fault, pendulous, or gravity controlled means for sensing slight deviation of the spin axis from its true vertical position and coincidentally applying the necessary correcting torques. These correcting devices, particularly when embodied in an air driven gyroscope, may preferably consist of a series of air valves, each adapted, when opened, to direct a jet of air in a particular correcting direction, and each with pendulous means operative to open a given valve when correction is required in the direction for which that valve is provided.

When, however, a gyroscope equipped with a gravity controlled device, for applying correcting torques as above indicated, is acted upon by any horizontal acceleration, such as occurs on a moving aircraft or other vehicle when rounding a curve, the gravity controlled device responds to the acceleration as against its tendency to conform to the gravity axis, thereby opening a valve and applying a correcting torque in a direction in which no correcting torque is required, and thus precessing the spin axis away from the true vertical.

It has been proposed to overcome the effect of these turn accelerations on the gravity controlled mechanism by providing means whereby, when the accelerating force thus produces a correcting force in a direction which is not required, it simultaneously produces an equal force in the opposite direction thereby to neutralize the unwanted correcting force.

It is, however, an object of this invention to provide means which, when such accelerations occur, instead of allowing them to produce an unwanted correcting torque, together with an equal and opposite neutralizing torque, will prevent the unwanted correcting torque from being applied initially.

Other objects, advantages, and meritorious features will become evident from a consideration of the following description, taken in conjunction with the drawings wherein:

Fig. 1 is a schematic illustration, in elevation, of the conventional pendulum valve assembly which is supported on the bottom of a conventional rotor housing, the valve ports all being half open which is the position occupied by them when no disturbing torques have tilted the spin axis away from the true vertical.

Fig. 2 is a section taken at 2—2 of Fig. 1.

Fig. 3 is a view like Fig. 1, except that some disturbing torque has tilted the spin axis away from its true vertical position, thereby closing one valve and opening another wide, whereby a correcting torque is provided for precessing the rotor axis back to its normal vertical position.

Fig. 4 is a section taken at 4—4 of Fig. 3.

Fig. 5 is a view like Fig. 1 except that the valves are under the disturbing influence of a right-hand turn, one valve being thereby opened and its opposite closed, whereby a correcting torque is applied when no correcting torque is needed.

Fig. 6 is a section taken at 6—6 of Fig. 5.

Fig. 7 is a vertical axial section taken longitudinally of the craft through the pendulum valve assembly, showing an improved means for correcting the effect of turn accelerations, the improvement being here shown in considerable detail.

Fig. 8 is a section taken transversely of the craft at 8—8 of Fig. 7 also showing the improved correcting means.

Fig. 9 is a section taken at 9—9 of Fig. 7.

Fig. 10 is a schematic illustration, in elevation, of a pendulum valve assembly with our improvement feature added, the conventional valves being half open as in Fig. 1, and the improvement feature being in the inactive state.

Fig. 11 is a section taken at 11—11 of Fig. 10.

Fig. 12 is a view like Fig. 10 except that some disturbing torque has tilted the spin axis away from its true vertical position, thereby closing one valve and opening another wide, whereby a correcting torque is provided for precessing the rotor axis back to its normal vertical position, the improvement feature being inactive even though the spin axis is tilted.

Fig. 13 is a section taken at 13—13 of Fig. 12.

Fig. 14 is a view like Fig. 10 except that the valves are under the disturbing influence of a right-hand turn, one valve being thereby opened and its opposite closed, the improvement being here active to prevent the conventional valves from applying the unwanted correcting torque.

Fig. 15 is a section taken at 15—15 of Fig. 14.

Fig. 16 is an elevation of a gyroscope to which our improvement has been added, parts being broken away to show some of the parts within.

Referring first to Fig. 16, the rotor housing 10, its rotor 12, and bearings 14, 16, etc., are of conventional design. The pendulum valve assembly 18, insofar as it consists of the pendulum body 20, valve ports 22, 24, 26, and 28, with the pendulous erecting vanes 30, 32, 34, and 36 pivoted to swing on pins 38, is likewise conventional (see schematic illustrations, Figs. 1 through 6). The pendulum body 20 is fastened to the housing 10 by screws 40. The improvement feature, which is the subject of this invention, is mounted within the pendulum body for cooperation with the pendulum valve ports and their control pendulums (see schematic illustrations, Figs. 7 through 15).

Figs. 1 and 2 show the conventional pendulum valve assembly 18 with the axis of the body 20 vertical, whereby the penduluous vanes 30, 32, 34, and 36 half cover their respective ports 22, 24, 26, and 28. This is the attitude which the axis of the rotor 12 and of the valve assembly 18 maintains when there are no disturbing influences tending to tilt it from its normal vertical position. In this position, four jets of air of equal force constantly emanate from the open half of the four ports whereby the rotor axis is kept in status quo.

When, however, some disturbing force, as for instance, change in longitude or latitude, or friction in the outer gimbal pivots due to change in flight attitude from level flight to climb, etc., precesses the rotor axis top-to-left as in Figs. 3 and 4, the vanes 30 and 34 remain vertical thereby opening the port 22 wide and closing the port 26, whereby a jet of air emanating from the port 22 creates an erecting force in the direction of the arrow 42 which precesses the rotor 12 back to the position it occupied in Figs. 1 and 2. Similarly when the disturbing force precesses the rotor top-to-right, the port 22 will be closed and the port 26 opened, and the rotor thereby precessed back to its vertical position. As long, therefore, as the vanes remain vertical the rotor axis will remain vertical and, when installed on an aircraft, indicate, by reference, the attitude of the craft with respect to the vertical.

But when the aircraft upon which the gyro is installed makes a turn, as for instance, a right turn as indicated by the arrow 44, the vanes 30 and 34 are acted upon by centrifugal force which swings them bottom-to-left away from the vertical as shown in Figs. 5 and 6, even though the rotor axis may, at the start of the turn be in its normal vertical position. This opens the port 22 and closes the port 26 which permits a jet of air to emanate from the port 22, causing an unwanted erecting force in the direction of the arrow 46 which precesses the rotor top-to-right away from the normal vertical position, thus giving an erroneous indication of the flight attitude which may be dangerous to the aircraft and the pilot if relied upon.

Thus, as is well known by those skilled in the art, the pendulum valve assembly 18 is highly successful in correcting deviations of the rotor axis from the vertical, it is also detrimental in that it causes deviations when a turn is effected. This difficulty, inherent in the conventional pendulum valve assembly, is effectively overcome by our improvement shown in Figs. 7 et seq.

Within the pendulum valve body 20 (see Fig. 7) a gimbal 48 carries an auxiliary rotor 50, the gimbal being supported on fore and aft pivots 52 in the body, and the rotor on transverse pivots 54 in the gimbal. The gimbal has fore and aft vanes 58 and 56 depending adjacent but normally not covering the ports 26 and 22, respectively. A nozzle 60 is carried on the plate 62 which is fitted to the inner contour of the valve body 20. The lower end of the valve body is closed by the plate 64. An extension spring 66 has the upper end anchored to the gimbal 48 at a point below its pivotal axis and its lower end anchored in the plate 64 whereby the auxiliary rotor axle is maintained in a plane normal to the plane of the main rotor axle except when the auxiliary rotor precesses clockwise or anticlockwise against the resistance of the spring.

Rotation of the auxiliary rotor 50 is in the direction of the arrow 68, Fig. 7, whereby precession due to a right-hand turn, as indicated by the arrow 70, Fig. 15, will be clockwise, as indicated by the arrow 72, Fig. 8.

The operation of the improved device is substantially as follows:

As long as the axis of the main rotor 12 has not been precessed from the true vertical position, the pendulous vanes 30, 32, 34, and 36 will hang vertically, and thus leave each of the ports 22, 24, 26, and 28 half open, whereby the torques of the four air jets neutralize each other and have no tendency to precess the main rotor axis. If, at the same time, there is no torque precessing, the auxiliary rotor axis away from its home position, which is normal to the main rotor axis, the valve assembly will appear as in Figs. 10 and 11.

When friction or other torques precess the main rotor axis, for instance top-to-left as in Figs. 12 and 13, the vanes 30 and 34 remain vertical while port 22 swings from under vane 30, and port 26 swings under vane 34, whereby a jet of air emanates from the port 22 and exerts a correcting torque in the direction of the arrow 74, Fig. 13. This correcting torque precesses the main rotor axis and pendulum body axis back to the true vertical as in Figs. 10 and 11. It should be noted that, when the main rotor axis is thus tilted (Figs. 12 and 13), the auxiliary gyro mechanism maintains its normal position with respect to the pendulum housing as in Figs. 7 and 8, the spring 66 assisting in maintaining this position, whereby the auxiliary vanes 56 and 58 maintain their position alongside but not over the ports 22 and 26. Thus far, in the description of the operation, the improved feature of this invention has not been called upon to act.

It is when a turn is negotiated, as for example a right turn along the arrow 70, Fig. 15, that the vanes 30 and 34, due to centrifugal force, swing bottom-to-left as shown in Figs. 14 and 15, whereby an unwanted erecting torque would be created in the direction of the arrow 46 if it were not arrested by other means, and would precess the main rotor axis and that of the pendulum body away from the true vertical.

Making the right-hand turn along the arrow 70, Fig. 15, however, precesses the auxiliary rotor 50 so that it turns the gimbal 48 on its pivots 52 in the direction of the arrow 72, Fig. 8, against the resistance of the spring 66, whereby the auxiliary vane 56 covers the port 22 which would otherwise be opened by the swinging of the vane 30. Obviously, making a left turn would cause the auxiliary vane 58 to cover the port 26 which would have been opened by the swinging of the vane 34.

From the foregoing it will be seen that the improvement over the art, added by our invention, will effectively correct turn errors in vertical gyro instruments without materially affecting normal erection characteristics and that gyro horizon indicators equipped with our improvement will provide a more reliable indication, and thus minimize hazards now inherent in that instrument.

Having described one embodiment of our invention, we claim:

1. In a gyro having a housing containing a main rotor with its axis normally vertical, a hollow valve body depending from said gyro, a plurality of erecting ports extending laterally through said hollow body, and pendulum controlled vanes adjacent said ports for opening said ports, the improvement which comprises an auxiliary gyro within said hollow valve body comprising a gimbal, an auxiliary rotor, pivot means for supporting said auxiliary rotor in said gimbal with the auxiliary rotor axis normal to the main rotor axis, means yieldably constraining said gimbal to maintain said auxiliary rotor in the position with its axis normal to the main rotor axis, and vanes controlled by precession of said auxiliary rotor to close certain of said ports when said pendulum controlled vanes have opened them.

2. In a gyroscope having its rotor axis vertical, the combination of air jet erecting means comprising a hollow member depending from said gyroscope and having opposed lateral ports and pendulums alongside the outer side of said ports operative upon deviation of the rotor axis from the vertical to remain vertical and thereby allow one of said opposed ports to open and the other to close, and operative upon a turn movement to swing from the vertical and thereby open one of said ports and close the other, with auxiliary port closing means alongside the inner side of said port, and an auxiliary gyroscope within said hollow member responsive to turn movements of said gyroscope to operate said auxiliary port closing means to closed position.

3. In a gyroscope, a main body, air jet erecting means consisting of a hollow valve body extending from said main body and having opposed erecting ports, pendulous vanes pivotally hung alongside said ports on the outside of said valve body, thereby to normally remain vertical so as to close or open said ports more or less as the axis departs one or the other direction from the vertical, but responsive to turn accelerations in one or the other directions to swing one or the other of said vanes to open position, auxiliary vanes inside said valve body adjacent said ports, and an auxiliary gyroscope unresponsive to departure of said valve body from the vertical, but responsive to turn accelerations to operate that one of the auxiliary vanes to closed position which is alongside the port opened by the outside vane due to said turn acceleration.

4. In a gyro-vertical, the combination of air jet erecting means comprising a hollow member carried by said gyro-vertical and having a lateral port, and pendulous means alongside the outer side of said port, operative upon deviation of the gyro from the vertical to remain vertical and thereby open said port, and operative upon a turn movement to swing from the vertical and thereby open said port, with port closing means alongside the inner side of said port, and an auxiliary gyroscope responsive to turn movements of said gyro-vertical to operate said port closing means to closed position.

5. In a gyro having a main rotor with axis vertical, and having a hollow valve body with a plurality of erecting ports extending laterally therethrough and pendulum controlled vanes adjacent said ports for opening said ports, the improvement which comprises an auxiliary gyro comprising a gimbal, an auxiliary rotor, pivot means for supporting said auxiliary rotor in said gimbal with the rotor axis normal to the main rotor axis, means yieldably biasing said gimbal to maintain said rotor with its axis normal to the main rotor axis, and vanes fixed to said gimbal and operated by precession of said auxiliary rotor to move said gimbal to close certain of said ports when said pendulum controlled vanes have opened them.

6. In an air operated gyro-vertical having a plurality of erecting ports and pendulum controlled means for opening said ports, the improvement which comprises an auxiliary gyro carried by said pendulum controlled means comprising an auxiliary gimbal, an auxiliary rotor, pivot means for supporting said auxiliary rotor in said auxiliary gimbal with axis normal to said gyro-vertical, and vanes fixed to said auxiliary gimbal and operated by precession of said auxiliary rotor to move said gimbal and cause said vanes to close certain of said ports when a turn acceleration has caused said pendulum controlled means to open them.

7. In an air operated gyro-vertical having erecting means comprising a plurality of erecting ports and pendulum controlled means for opening said ports, the improvement which comprises an auxiliary gyro carried by said erecting means comprising an auxiliary gimbal, an auxiliary rotor, pivot means for supporting said auxiliary rotor in said auxiliary gimbal with axis normal to the gyro-vertical, and vanes controlled by precession of said auxiliary rotor from the normal to close certain of said erecting ports when a turn acceleration has caused said pendulum controlled means to open them.

8. In a gyro-vertical, the combination of air jet erecting means comprising a hollow member carried by said gyro-vertical and having a lateral port, and pendulous means adjacent the outer side of said port, operative upon deviation of the gyro from the vertical to remain vertical and thereby open said port, and operative upon a turn movement to swing from the vertical and thereby open said port, with port closing means adjacent the inner side of said port, and gyro operated means responsive to turn movements of said gyro-vertical to operate said port closing means to closed position.

9. In a gyro-vertical, the combination of air jet erecting means comprising a hollow member having a lateral port and pendulous means pivoted on said hollow member adjacent the outer side of said port responsive to deviation of the gyro from the vertical to open said port, with port closing means carried by said hollow member adjacent the inner side of said port, and precessible means carried by said hollow member and connected to said port closing means responsive to turn movements of said gyro-vertical to operate said port closing means.

10. In a gyro-vertical, a main body, air jet erecting means consisting of a hollow valve body extending from said main body and having opposed erecting ports, pendulous vanes pivotally hung alongside said ports on the outside of said valve body whereby they normally remain vertical and thereby close or open said ports more or less as the gyro axis departs in one or the other direction from the vertical, but are responsive to centrifugal force during turn accelerations in one or the other direction to swing said vanes so that one or the other is in the open position, auxiliary vanes inside said valve body adjacent said ports, and auxiliary gyro means carried by said valve body, precessible by said turn accelerations, and operatively connected to said auxiliary vanes to close that one of the auxiliary vanes which is alongside the port opened by the main vane during a turn acceleration.

MARLIN C. MOORE.
HENRY BRIDGMAN.

REFERENCES CITED

The following references are of record in the file of this patent:

UNITED STATES PATENTS

| Number | Name | Date |
|---|---|---|
| 1,934,774 | Sperry et al. | Nov. 14, 1933 |
| 2,242,806 | Wunsch | May 20, 1941 |

FOREIGN PATENTS

| Number | Country | Date |
|---|---|---|
| 551,079 | Great Britain | Feb. 8, 1943 |